Feb. 23, 1965

C. A. SMITH ETAL 3,170,699

MANURE SPREADER

Filed March 25, 1963

INVENTORS
CHARLES A. SMITH
& HORACE G. MC CARTY
BY Joseph A. Brown
ATTORNEY

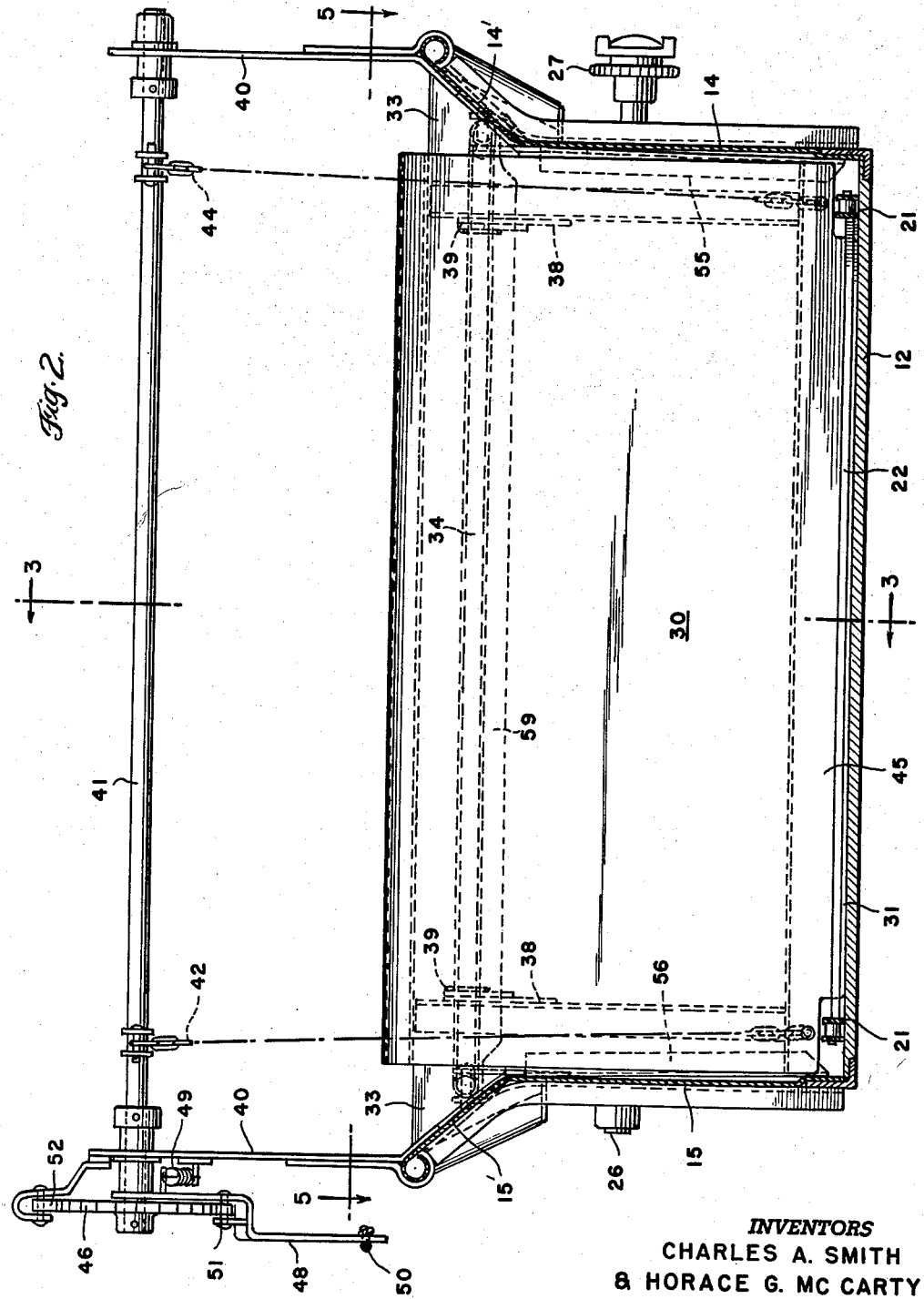

Feb. 23, 1965   C. A. SMITH ETAL   3,170,699
MANURE SPREADER
Filed March 25, 1963   4 Sheets-Sheet 3
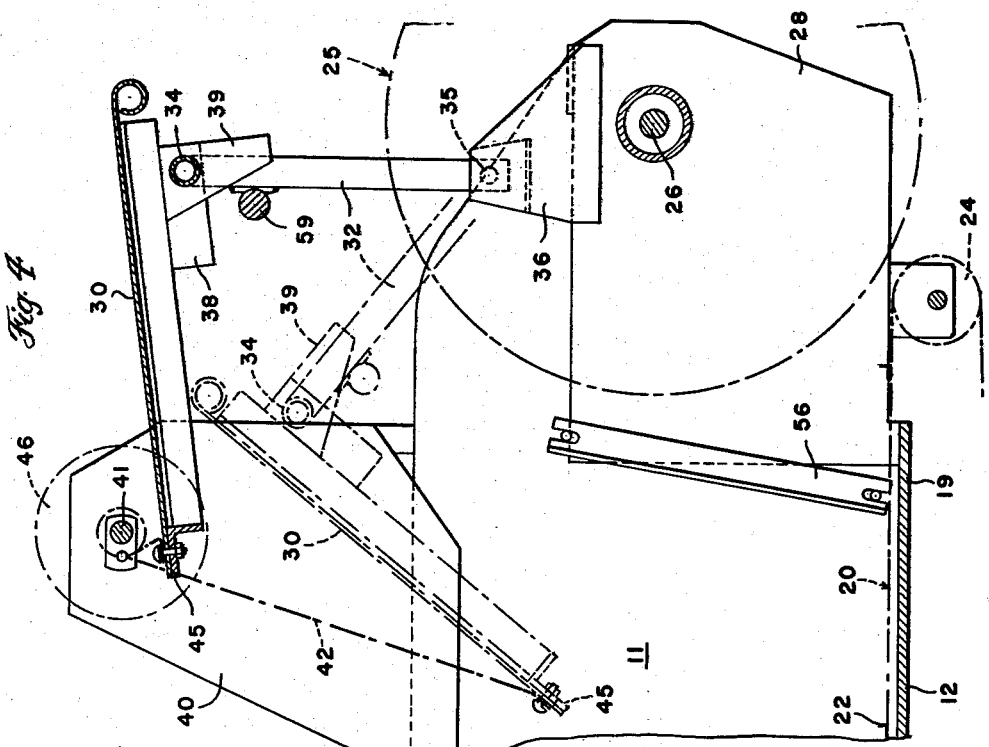
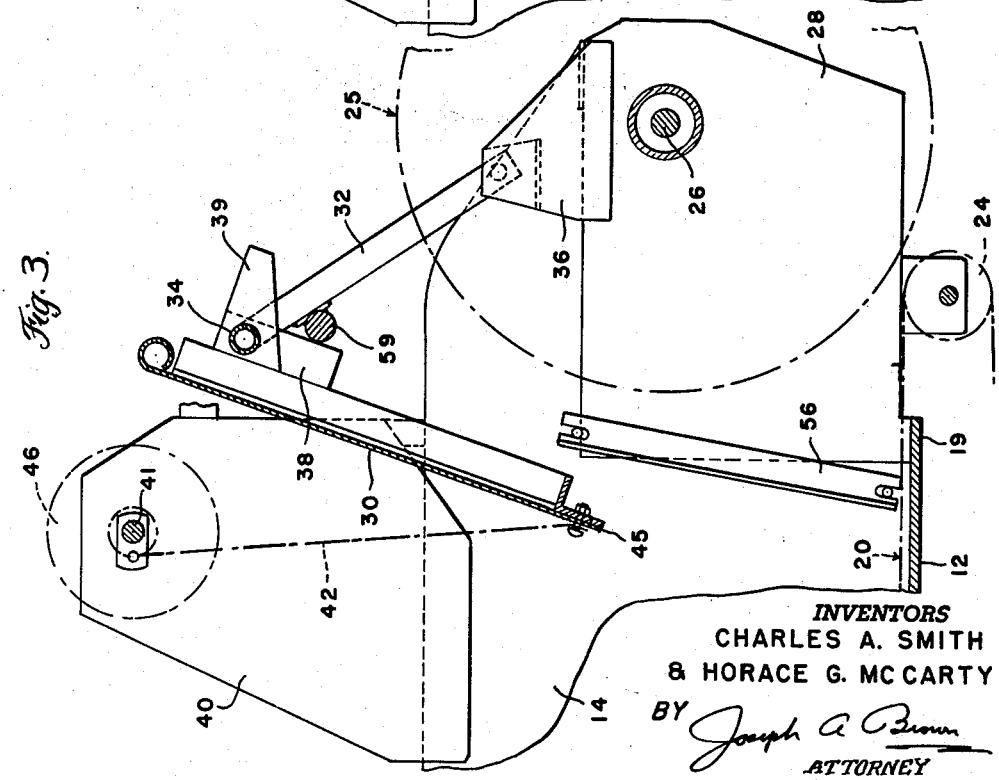
INVENTORS
CHARLES A. SMITH
& HORACE G. MCCARTY
BY
*Joseph A. Brown*
ATTORNEY

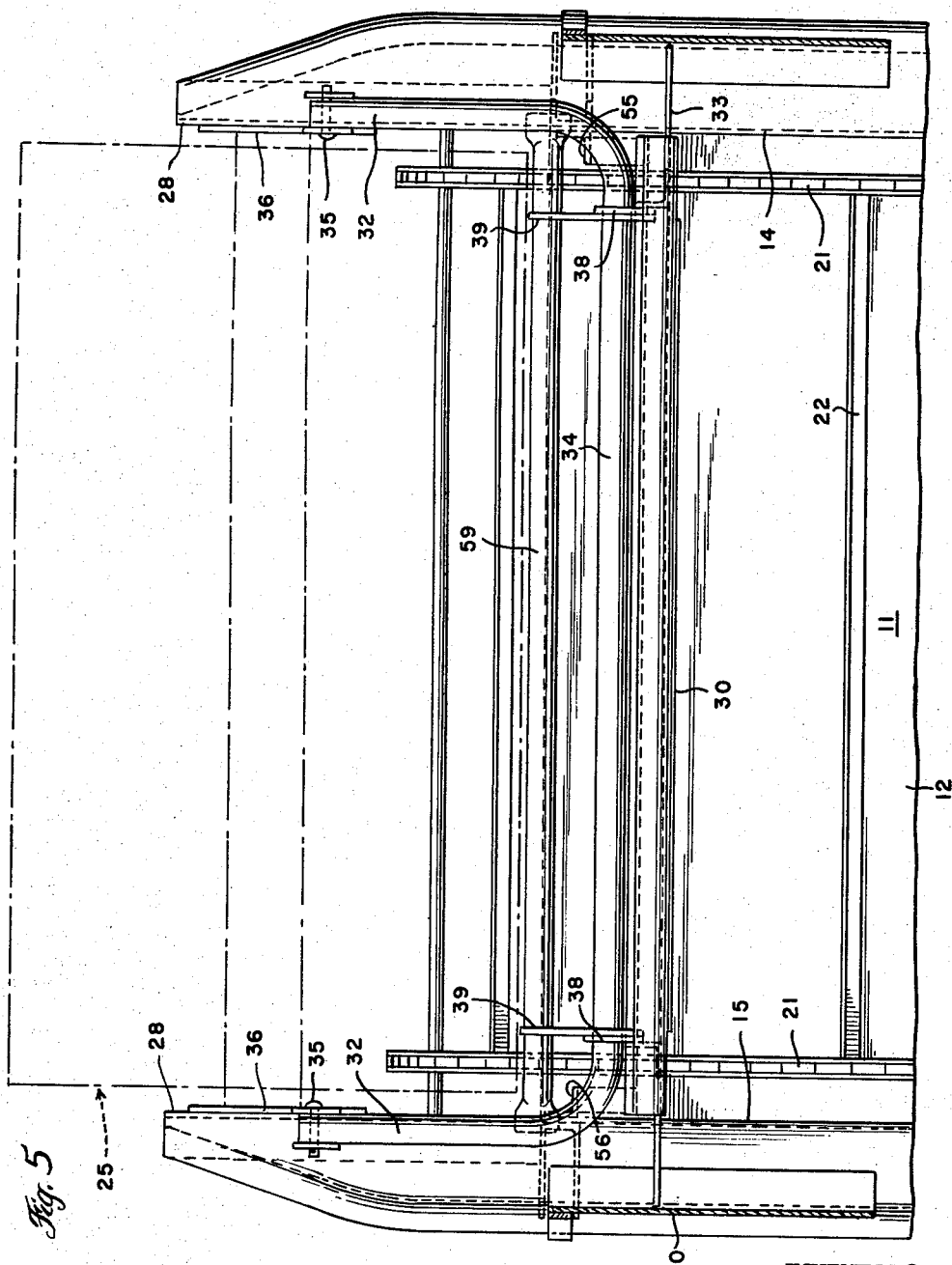

United States Patent Office 3,170,699
Patented Feb. 23, 1965

3,170,699
MANURE SPREADER
Charles A. Smith and Horace G. McCarty, New Holland, Pa., assignors to Sperry Rand Corporation, New Holland, Pa., a corporation of Delaware
Filed Mar. 25, 1963, Ser. No. 267,534
5 Claims. (Cl. 275—6)

This invention relates generally to manure spreaders. More particularly, the invention relates to an improved gate structure for retaining manure of a semi-fluid nature within the box of a spreader during transit to a disposal area.

In certain farm operations, accumulated manure is semi-fluid in nature due to the lack of adequate bedding material to soak up fluids and give the product a solid condition. For sanitation and esthetic reasons it is highly desirable that waste be hauled out of barns by means whereby the product will be retained in the spreader box during transit. Further, in certain sections of the country, milk shed regulations and litter laws have been established which require that means be provided to prevent discharge and spillage when manure is being transported from a barn to a field where it is to be spread.

One object of this invention is to provide an improved load retention gate for a manure spreader, the gate being operative to retain the load in the box during transit to the disposal location.

Another object of this invention is to provide a manure spreader gate which is movable to an inoperative location on the spreader where it will not interfere with the use of the spreader in a conventional manner when a sealer gate is not necessary.

Another object of this invention is to provide a manure spreader gate which extends vertically when in box closing position and when elevated from such position its verticality is maintained for a portion at least of the elevation distance.

Another object of this invention is to provide a gate which is so mounted that when it is moved from a closed and toward an opened position, it shifts away from the load to relieve the pressure of the material against the gate.

A further object of this invention is to provide a gate of the character described which is pivotally supported, means being provided and operative therewith to insure that the gate does not pivot beyond a certain amount and into the path of beater means employed on the spreader.

A still further object of this invention is to provide a gate which, when in a given elevated position, provides a shield against material thrown forwardly by the beater and toward the operator on the tractor towing the spreader.

A still further object of this invention is to provide a manure spreader gate construction which is relatively simply designed whereby it may be manufactured and assembled at low cost.

Other objects of this invention will be apparent hereinafter from the specification and from the recital in the appended claims.

In the drawings:

FIG. 2 is a transverse vertical section taken on the line 2—2 of FIG. 1 looking in the direction of the arrows;

FIG. 3 is a longitudinal vertical section taken on the line 3—3 of FIG. 2 looking in the direction of the arrows and showing the gate in an intermediate retracted position;

FIG. 4 is a view similar to FIG. 3 showing the gate fully retracted in solid lines and in a lowered, partially opened, shielding position in dotted lines; and FIG. 5 is a plan view taken generally on the line 5—5 of FIG. 2 looking in the direction of the arrows.

Figure 1:
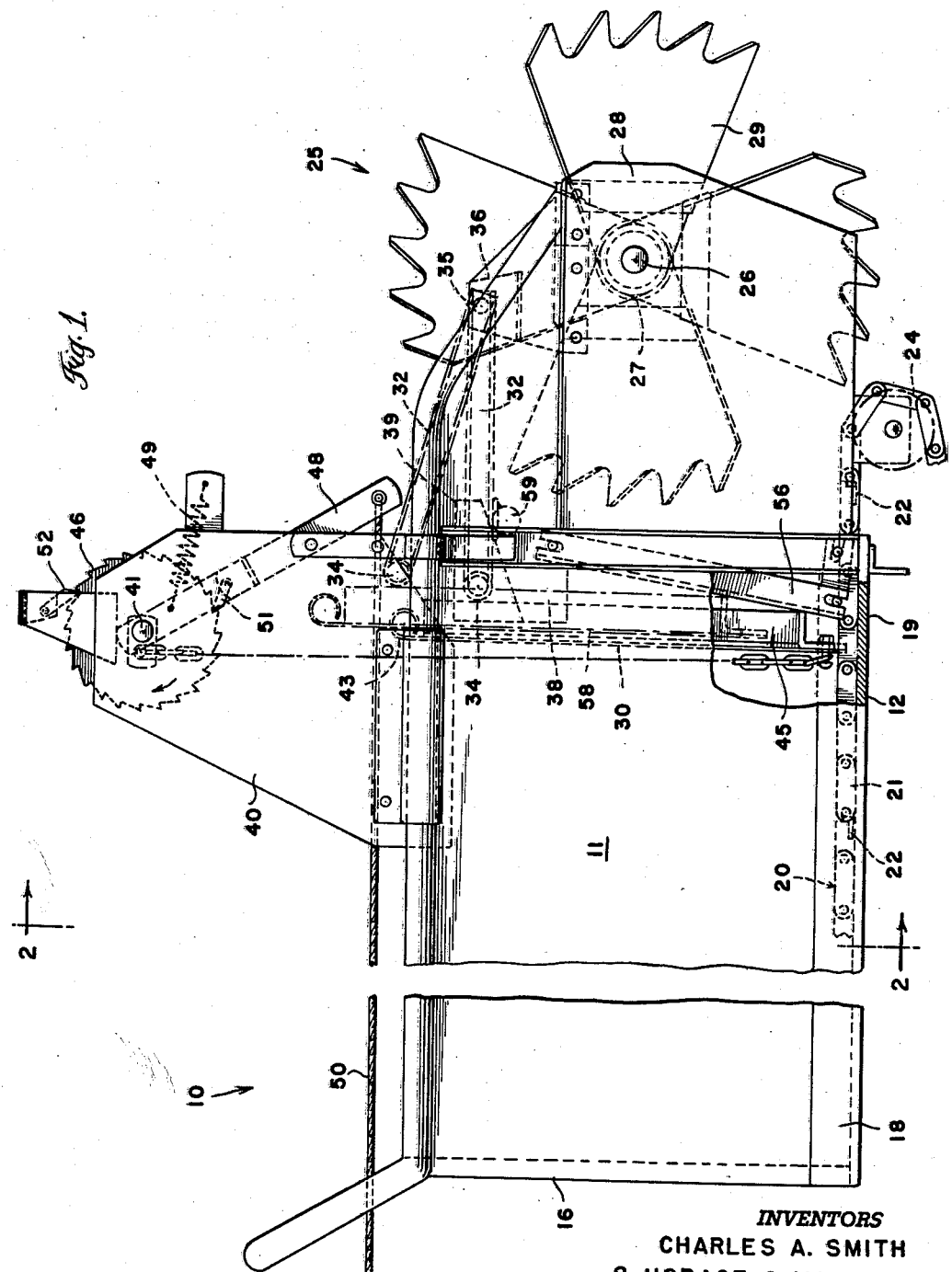
FIG. 1 is a fragmentary side elevation of a manure spreader having a gate constructed according to this invention, the gate being shown in a lowered box closing position, a second partially opened position of the gate being denoted by dotted lines.

Referring now to the drawings by numerals of references, 10 denotes a manure spreader comprising a box 11 having a floor 12, a pair of longitudinally extending laterally spaced upright side walls 14 and 15, and an upright front wall 16 at a forward closed end 18 of the box. A rearward end 19 of box 11 is opened for the discharge of material. Operative for travel across the floor 12 is an apron 20 having a pair of fore-and-aft chains 21 which carry transversely extending slats 22 spaced from each other and operative to move material in the box 11 from the forward end 18 and toward discharge end 19. When viewed as shown in FIG. 1, the upper reach of the apron 20 travels rearwardly and then around a sprocket 24.

For disintegrating and spreading the manure discharged from box 11, a beater 25 is provided and rotatable on shaft 26 extending transversely and supported on extension plates 28 projecting rearwardly from the box sides 14 and 15. Beater 25 has angularly spaced blades 29 which produce the spreading action. When viewed as shown in FIG. 1, beater 25 rotates in a clockwise direction by conventional drive means including sprocket 27.

In order to prevent the escape of manure from box 11 when the spreader is loaded and when it is being transported from the barn to the field, a gate 30 is provided and mounted for movement from a lowered box closing position as shown in FIG. 1 to an elevated position as shown in FIG. 4. Gate 30 comprises a substantially plane, liquid impervious metal plate which extends generally vertically when the gate is in closed position. The gate traverses the space between side walls 14 and 15 of the spreader box and projects upwardly slightly above the box sides. The box sides are flared outwardly at 14' and 15', respectively, and gate 30 has wings 33 which match these flared portions. At its lower end, gate 30 is provided with a downwardly projecting neck 31, as shown best in FIG. 2 which extends to the floor 12 of the spreader box between successive apron slats and also between the chains 21 of the apron. This provides a seal across the major portion of floor 12. While slight openings are provided for chains 21 of the apron, solid material quickly closes such openings and prevents the escape of manure from the box.

Gate 30 is located in front of the beater 25 when in closed position. It is pivotally supported on a U-shaped bar 34, wherein the bight of the U projects forwardly. Bar 34 has legs 32 the ends of which are pivotally connected at 35 on suitable brackets 36 connected to the rear plate extensions 28 of the spreader box sides. A pair of angularly spaced stop plates 38 and 39 are located at each end of the U-bar. Plates 39 provide a pivotal connection between the bar and gate 30. The stop 38 limits pivotal movement of gate 30 in a counterclockwise direction (FIG. 3) while the stop 39 limits pivotal movement of gate 30 in a clockwise direction as shown in the dotted position of FIG. 4. The lengths of the legs 32 of U-bar 34 are such that gate 30 is caused to extend vertically when in a lowered closed position, FIG. 1.

Mounted on vertically extending supports 40 is a cross-shaft 41 to which a pair of chains are connected, namely chain 42 and chain 44. These chains are laterally spaced from each other and extend downwardly from the cross-shaft 41 for connection to the lower end 45 of gate 30. The chains extend adjacent to the insides of side walls 14 and 15 of the spreader box. When viewed as shown in FIG. 1, cross-shaft 41 is adapted to be rotated in a clockwise direction by a ratchet wheel 46, mounted on one end of the shaft. A lever arm 48 is swingable about the shaft axis. The lever arm is biased in one direction by a spring 49 and it is adapted to be pivoted in the opposite direction by a rope 50 connected to the outer end of the lever and extending forwardly for control by the operator on the tractor which pulls the spreader. Lever 48 carries a pawl 51 which engages ratchet wheel 46 so that each time rope 50 is pulled forwardly, lever 48 is pivoted and the ratchet wheel will be rotated. Spring 49 will then return the lever to its starting position when the rope is released so that the lever may be again pulled to further rotate the ratchet. A holding pawl 52 is provided to prevent retrogressive rotation of the ratchet wheel. The holding pawl is adapted to be manually thrown and pivoted from operative position when it is desired to allow ratchet wheel 46 to reverse rotate. When rotated in a clockwise direction as shown in FIG. 1, the chains 42 and 44 wrap around shaft 41 and cause gate 30 to be elevated.

When gate 30 is in lowered box closing position the load of material in the box presses against the gate and urges it in a rearward direction toward the beater 25. Such movement is prevented at the gate upper end 43 by U-bar 34 and the lower end 45 of the gate is prevented from swinging rearwardly by guides 55 and 56 mounted on side walls 14 and 15, respectively, of the spreader box. The lower ends of the guides are located adjacent floor 12 and they are inclined upwardly and rearwardly therefrom. The guides are so related to U-bar 34 that when gate 30 is elevated toward retracted position, the verticality of the gate is maintained for a portion of the travel of the gate in an upward direction. As shown in FIG. 1, when gate 30 is elevated to the dotted position 58, the gate still extends substantially vertically. However, it will be noted that the gate has been shifted rearwardly relative to the box 11 whereby the pressure of the material against the gate is relieved as it is lifted.

When the material in box 11 is substantially semi-fluid the gate may be stopped in a moderately elevated position and the apron 20 can be operated to discharge material under the gate and to the beater 25. If the operator wishes to open the box further, he may elevate the gate to the position shown in FIG. 3. It will be noted that as the gate 30 is elevated, it pivots relative to U-bar 34 and the legs 32. After a given amount of pivotal movement, stops 38 engage a cross-bar 59 extending between the legs 32 of the U-bar. The position shown in FIG. 3 occurs when the material in box 11 is continuing to exert a load against the gate tending to force it rearwardly. Thus, the gate pivots to the position shown. When fully retracted, gate 30 extends almost horizontally as shown in the solid line position of FIG. 4. When in an unloading operation and the last portion of the load is reached, there is a substantial tendency for the beater 25 to cast material in an upward, forward trajectory. At that time, the operator may wish to lower gate 30 to the dotted line position shown in FIG. 4. Since the loaded material is now low in the box 11, there is no force against the gate and when it is lowered, it assumes a position as shown. At this time, the stop 39 engages cross-bar 59 and limits pivotal movement of the gate 30 relative to the supporting U-bar 34. When the gate is lowered all the way back toward box closing position, the gate again pivots toward the position shown in FIG. 3. At a given point, the gate will engage guides 55 and 56, which will insure that the gate will not pass into the path of the beater 25.

If the manure to be handled is solid and no gate is required, the operator merely positions gate 30 in the retracted position shown in solid lines in FIG. 4. In such out of the way location, gate 30 does not interfere with the operation of the spreader and the implement may be used in a conventional manner.

With the structure described, the gate 30 substantially closes box 11 when the box is filled with material. When the gate is elevated, its verticality remains substantially constant for a given amount of travel upwardly of the gate. After a given point is reached, the gate then swings in an arc about the beater 25. The operator may locate the gate in the position shown in dotted lines in FIG. 4 to provide a shield against material thrown forwardly by the beater. Since the gate 30 extends substantially vertically when in closing position, the load developed by the material in box 11 is carried by the floor 12 of the spreader and not by the gate. While there is rearward pressure against the gate established by the material, such pressure is relieved when the gate is elevated since the gate as a whole shifts rearwardly as it moves upwardly and at the same time retains its verticality so that it continues to exert proper control on the material in the box. The structural arrangement provided gives the desired characteristics and with an arrangement which is relatively simple to manufacture and install. In geographical locations where there are milk shed regulations or litter laws covering wagon leakage, gate 30 is essential rather than merely desirable. Spillage and inadvertent discharge of material is substantially prevented and very considerable practical and esthetic results are obtained.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A manure spreader for fluid-solid material comprising a generally horizontally extending box having a floor, a pair of upright spaced longitudinal side walls, a forward end, a rear end and an upright wall closing said forward end, an apron movable over said floor and operable to convey material toward said box rear end, a beater supported at said box rear end and rotatable about a transverse axis to spread discharged material, a gate normally located in a substantially vertical position in front of said beater and extending between said side walls to close said box rear end, means connected to said gate and operative to lift the gate from said normal position to open said box, support means mounted for pivotal movement about a transverse axis rearwardly of said gate, means pivotally connecting the upper end of said gate to said support means for limited free swinging movement relative thereto, inclined guides carried inside said box on said side walls and engageable with a lower end of said gate, said guides having lower ends adjacent said box floor and extending upwardly and rearwardly therefrom, the location of said support means being such relative to said guides that as the gate is elevated to a given point from said closing position the lower end of the gate is forced against the guides by pressure of material in the box and the upper end pivots on said support means, said gate remaining substantially vertical as it moves upwardly and at the same time shifting rearwardly to relieve the force of the material thereagainst.

2. A manure spreader as recited in claim 1 wherein said support means comprises a pair of arms pivotally carried at rearward ends thereof on said box side walls and extending in a horizontal direction forwardly to said gate when the gate is in said normal position, and a pair of angularly spaced stops being provided on said gate and engageable with a member on said support means to limit pivotal movement of the gate in two directions.

3. A manure spreader as recited in claim 1 wherein said gate elevating means comprises a cross-shaft mounted above said box rear end, a pair of chains connecting said shaft to said lower end of said gate and on the side of the gate facing the material in the box, and means for rotating said shaft to wrap said chains about the shaft and thereby elevate the gate.

4. A manure spreader for fluid-solid material comprising a generally horizontally extending box having a floor, a pair of spaced upright longitudinal side walls, a forward end, a rear end and an upright transverse wall closing said forward end, an apron moving over said floor and operable to convey material toward said box rear end, a beater supported on said box rear end and rotatable about a transverse axis to spread discharged material, a gate normally located in a lower vertical position in front of said beater and extending between said side walls to close said box rear end, means connected to said gate and operative to lift the gate from said normal position to open said box, a pair of laterally spaced legs, one on each of said side walls, each leg having one end pivotally connected to its associated side wall and an opposite end pivotally connected to said gate adjacent an upper rear portion thereof, the gate being freely swingable about the pivot points on said opposite ends, the pivotal connections for said legs having transverse axes relative to said box, said legs extending generally horizontally when said gate is in said normal location and holding the upper portion of the gate against rearward movement, a pair of cooperative guides, one carried on each of said side walls, and engaged by a lower portion of said gate, said guides being upwardly and rearwardly inclined and holding said gate lower portion from rearward movement, responsive to pressure of said material in the box, said gate when elevated from said normal location to a given point pivoting about each leg one end and said legs shifting the upper portion of the gate rearwardly and the incline of said guides being such that the lower portion of the gate simultaneously shifts rearwardly an amount corresponding to the shifting rearwardly of the gate upper portion whereby as the gate is elevated its verticality remains substantially the same and at the same time the gate shifts rearwardly to relieve the force of material against it.

5. A manure spreader as recited in claim 4 wherein a stop is provided between at least one of said legs and said gate to stop pivotal movement of the gate relative to the legs after the gate has been elevated to said given point, thereafter said gate swinging in an arc about the connections of said legs to the box side walls and assuming a position between said beater and an upper portion of said box to provide a shield and prevent material from being thrown forwardly by the beater.

References Cited by the Examiner
UNITED STATES PATENTS

| | | | |
|---|---|---|---|
| 369,102 | 8/87 | Davis | 105—282 X |
| 696,643 | 4/02 | Kinney | 275—3 |
| 867,019 | 9/07 | Dennis et al. | 275—5 |
| 2,043,151 | 6/36 | Button | 275—5 |
| 2,699,949 | 1/55 | Neighbour | 275—5 |
| 2,876,014 | 3/59 | Markel | 275—3 |

T. GRAHAM CRAVER, *Primary Examiner.*

ABRAHAM G. STONE, *Examiner.*